United States Patent
Wehner et al.

[15] 3,653,809

[45] Apr. 4, 1972

[54] PROCESS FOR THE REMOVAL OF ACIDIC CONSTITUENTS FROM GASEOUS MIXTURES

[72] Inventors: Klaus Wehner; Horst Grunert, both of Leuna; Werner Kisan, Halleneustadt; Gerhard Esser, Leuna; Horst Knopel, Leipzig; Dietmar Flad, Zoschen, all of Germany

[73] Assignee: VEB Leuna-Werke Walter Ulbricht, Leuna, Germany

[22] Filed: Mar. 9, 1970

[21] Appl. No.: 17,859

[52] U.S. Cl. .................................23/2 A, 55/68, 55/73
[51] Int. Cl. ...............................B01d 53/34, B01d 53/16
[58] Field of Search..................23/2, 2 A, 3, 3 LA; 55/68, 55/73; 260/239.3 A

[56] References Cited

UNITED STATES PATENTS

| | | | |
|---|---|---|---|
| 1,882,289 | 10/1922 | Lush | 23/3 LA |
| 3,039,251 | 6/1962 | Kamlet | 23/2 X |
| 3,161,461 | 12/1964 | Deal et al. | 23/2 |
| 3,000,879 | 9/1961 | Phillips et al. | 260/239.3 |

*Primary Examiner*—Earl C. Thomas
*Attorney*—Nolte and Nolte

[57] ABSTRACT

Acidic constituents are removed from gaseous mixtures by washing with a solvent which comprises a N-substituted $\epsilon$-caprolactam. The solvent may also contain water and/or an alkanolamine. These solvents are advantageous, because, even in the presence of water, they cause no corrosion.

4 Claims, No Drawings

PROCESS FOR THE REMOVAL OF ACIDIC CONSTITUENTS FROM GASEOUS MIXTURES

This invention relates to gaseous mixtures and more specifically to a novel method for the separation of acidic constituents from technical gaseous mixtures, such as natural gases, synthetic gases, city gases and others.

Several processes are known in the art for the removal of acidic constituents from mixtures of gases. For instance, Ullmann, in Enzylkopadie der technischen Chemie, 3rd Ed., Vol 9, (1957) p. 759, German Pat. No. 1,154,591 and German Pat. No. 1,201,942 describe a process according to which the gaseous mixture is washed with water, N-methyl-2-pyrrolidone, propylene carbonate or methanol. The acidic components, for instance hydrogen sulfide, carbon dioxide and carbon oxysulfide, are physically absorbed by the solvent.

The process of German Pat. No. 1,057,075 is based on a chemical reaction between the acidic constituents and basic reagents. More specifically, basic aqueous solutions, such as solutions of alkanolamine and alkali salts of weak acids are used to wash out the acidic components. In this manner, the acidic carbon dioxide, hydrogen sulfide and carbon oxysulfide are removed by chemical reaction.

French Pat. No. 1,427,338 and French Pat. No. 1,428,356 describe methods for improving the removal of gaseous acidic constituents from mixtures, which consist of washing the mixtures with mixtures of solvents capable of dissolving the gases as well as reacting chemically with the acidic gases. Manifestly, the removal of the acidic gases according to this process is due, both, to a physical reaction and a chemical reaction. Examples of such mixtures of solvents are 1,1- dioxytetrahydrothiophene together with an alkanolamine and N-methyl-pyrrolidone together with an alkanolamine.

When water is used as a solvent, it is necessary to use a large amount of solvent on account of the low coefficient of solubility of the acidic gases in water. This method is very expensive because of the high energy requirement. When N-methyl-(2)-pyrrolidone is the solvent, the energy requirement is lower, but the corrosion of the solvent, in mixture with water, to carbon steel, constitutes a serious disadvantage.

When propylene carbonate is used as the solvent for the gaseous acidic constituents, substantial losses of the solvent occur by decomposition and evaporation.

It has also been suggested to use methanol as a solvent for the acidic gases. However, this method must be conducted at low temperatures because of the high vapor pressure of the solvent. This method manifestly is expensive because of the high energy requirement and because of the necessity of substantial capital investment.

Also the methods in which a chemical reaction is utilized to bind chemically the acidic gases from gaseous mixtures, for instance by means of aqueous solutions of alkanolamines and alkali salts of weak acids, are expensive, because of the apparatus limitations and the high energy requirements. This is particularly the case with substances such as over-all dioxide which have poor ability to pass from the gaseous into the liquid phase. The processes in which a solvent mixture is used which is capable, both, of dissolving physically as well as binding chemically the gases, for instance with the mixture of N-methyl-2-pyrrolidone and an alkanolamine or with 1,1-dioxytetrahydro-thiophene and an alkanolamine are advantageous in several respects. First of all, the rate of reaction of the acidic gases is increased. Other substantial advantages are the stability of the solvent mixture, the vapor pressure of the solvents, as well as the lower cost of the overall process.

An object of this invention is to provide a process for the removal of acidic gases from gaseous mixtures which is economical, suitable for large scale operation and which may be conducted with simple equipment.

Another object is to provide a solvent mixture for the removal of acidic components from gaseous mixtures which does not cause corrosion of steel. A further object is to provide solvents suitable for the removal of gaseous acidic components which are easily available and inexpensive. A further object is to provide a process which is suitable for the removal of gaseous constituents from soil gases, synthetic gaseous mixtures and city gases.

The gist of this invention resides in the finding that superior results in the removal of gaseous components are achieved by the use of a N- substituted ε- caprolactam as the solvent. Particularly appropriate are N-methyl-ε-caprolactam, N-ethyl-ε-caprolactam, N-butyl-**N-butyl-ε and N-(β-cyanoethyl)-ε-caprolactam. Solvent mixtures containing a N- substituted ε-caprolactam are also appropriate.

The process according to the invention may be modified according to the concentration of the acidic gases and it is advantageous, in some instances, to use a mixture of the N-substituted ε-caprolactam with alkanolamines and/or water. A suitable proportion of alkanolamines is between 0 and 60 percent and in the case of water, the concentration is advantageously between 0 and 40 percent.

Conventional processes known in the art may be used with the solvents and solvent mixtures of this invention, for instance washing countercurrently. This technique may be conducted under pressure or without pressure, according to the content of acidic gases in the mixture.

The N- substituted ε-caprolactams and particularly N-methyl-ε-caprolactam, exhibit good solvent power towards acidic gases. They cause very little corrosion in steel. The corrosion tests with steel were conducted for a period of 28 days in the liquid phase. The results are summarized in Table 1 below.

TABLE 1.—CORROSION OF THE SOLVENTS IN CARBON STEEL C-15

| Name of solvent | Water percent | Temp. in °C. | Corrosion in mm./yr. |
|---|---|---|---|
| N-methyl ε-caprolactam | 25 | 100 | 0.01 |
|  | 100 | 100 | 0.03 |
| N-methyl-(2)-pyrrolidone 1,1-dioxy-tetrahydrothiophene | 25 | 100 | 0.32 |
|  | 20 | 110 | 0.21 |

The data in Table 1 prove that the N- substituted -ε- caprolactams and particularly N-methyl-ε-caprolactam are superior to other solvents because of their stability to heat and to chemicals. N-methyl-ε-caprolactam gives no sign of decomposition, on heating to the boiling point at normal pressure, that is at a temperature of 235° – 236° C. The substance is also very stable under conditions favoring hydrolysis. For instance, no hydrolysis of the lactam ring takes place in a mixture of N-methyl ε-caprolactam, water and an alkanolamine under the experimental conditions required for the removal of the acidic gases, that is 4 weeks at 90° C.

The corrosive power of mixtures of N-methyl-ε-caprolactam and water or an alkanolamine is very small. For instance, mixtures of 60% of N-methyl-ε-caprolactam, 20% of water and 20% of diethanolamine or diisopropylamine does not attach carbon steel C–15, in an atmosphere of carbon dioxide, after a period of 28 days at 90° C.

Another advantage resulting from the use of the N- substituted caprolactams in accordance with this invention, is that the substances are commercially available, inexpensive and may be easily prepared by synthetic methods. For instance, N-methyl-ε-caprolactam is synthesized by the simple reaction of ε- caprolactam and methanol. Another advantage is that the N- substituted ε- caprolactams may be used without purification and fractions of inferior quality may be used.

The following examples are set forth hereinbelow for the purpose of further clarification of the invention.

EXAMPLE 1.

A gaseous mixture of 40% $CO_2$, 1.5% of CO, 0.3% of $N_2$, 0.2% of $CH_4$ and 58% of $H_2$ at a feed rate of $20m^3$ (measured at 1 atmosphere and 0° C.) per hour, in a testing plant, was subjected to washing with 0.6 $m^3$ per hour of N-methyl-ε-caprolactam as a solvent, at 25° C. and at a pressure of 25 atmospheres. The solvent which contained material in solution, was recovered by expansion to atmospheric pressure. The purified gas contained 6 percent by volume of $CO_2$.

EXAMPLE 2.

A gaseous mixture of 40% $CO_2$, 1.5% of CO, % of $N_2$, 0.2% of $CH_4$ and 58% of $H_2$ at a feed rate of 20m³ (measured at 1 atmosphere and 0° C.) per hour, in a testing plant, was subjected to washing with 0.65 m³ per hour of N-ethyl-$\epsilon$-caprolactam, as a solvent at 25° C. and 25 atmospheres. The laden solvent was recovered by expansion to atmospheric pressure. The purified gas contained 6 percent by volume of $CO_2$.

EXAMPLE 3.

A gaseous mixture of 40% $CO_2$, 1.5% of CO, 0.3% of $N_2$, 0.2% of $CH_4$ and 58% of $H_2$ at a feed rate of 20m³ (measured at 1 atmosphere and 0° C.) per hour, in a testing plant, was subjected to washing with 0.8 m³ per hour of N-($\beta$-cyanoethyl)-$\epsilon$-caprolactam as a solvent, at 25° C. and at a pressure of 25 atmospheres. The solvent which contained material in solution, was recovered by expansion to atmospheric pressure. The purified gas contained 6 percent by volume of $CO_2$.

EXAMPLE 4.

A gaseous mixture of 40% $CO_2$, 1.5% of CO, 0.3% of $N_2$, volumes of % of $CH_4$ and 58% of $H_2$ at a feed rate of 20m³ (measured at 1 atmosphere and 0° C.) per hour, in a testing plant, was subjected to washing with 0.65 m³ per hour of N-butyl 25°-caprolactam as a solvent, at 25° C. and at a pressure of 25 atmospheres. The solvent which contained material in solution, was recovered by expansion to atmospheric pressure. The purified gas contained 6 percent by volume $CO_2$.

EXAMPLE 5.

A gaseous mixture of 8% $CO_2$, 45% CO, 46% hydrogen, with residual amounts of $CH_4$ and $N_2$, at a feed rate of 20 m³ (measured at 1 atmosphere and 0° C.) per hour, was subjected to washing in a testing plant similar to the plant used above with 0.150 m³ per hour of solvent at 20° C. and 25 atmospheres. The solvent consisted of 60% of N-methyl -$\epsilon$-caprolactam, 20 percent of diisopropanolamine and 20 percent of water. Under these conditions, the $CO_2$ content in the purified gas was reduced to less than 0.5%. The solvent was recovered at a temperature of 90° – 95° C.

What is claimed is:

1. A process for the removal from a gaseous mixture of at least one acidic gas selected from the group consisting of hydrogen sulfide, carbon oxysulfide and carbon dioxide, comprising washing the mixture with a solvent comprising at least one N-substituted $\epsilon$-caprolactam selected from the group consisting of N-methyl-$\epsilon$-caprolactam, N-ethyl-$\epsilon$-caprolactam, N-butyl-$\epsilon$-caprolactam, and N-($\beta$-cyanoethyl)-$\epsilon$-caprolactam.

2. The process according to claim 1 wherein said solvent contains in addition to said N- substituted $\epsilon$- caprolactam at least one member selected from the group consisting of water, diethanolamine and diisopropanolamine.

3. The process according to claim 2 wherein the solvent consists of a mixture of 60 percent of N- methyl -$\epsilon$- caprolactam, 20 percent of diisopropanolamine and 20 percent of water.

4. The process according to claim 3 wherein the gaseous mixture contains carbon dioxide, carbon monoxide, nitrogen, methane and hydrogen, and carbon dioxide is present in the amount of 8 percent, and after washing, the purified gas contains less than 0.5 percent of carbon dioxide.

* * * * *